United States Patent
Iaquaniello et al.

(10) Patent No.: US 9,776,863 B2
(45) Date of Patent: Oct. 3, 2017

(54) METHOD FOR HYDROGEN PRODUCTION

(75) Inventors: Gaetano Iaquaniello, Rome (IT);
Barbara Cucchiella, Rome (IT); Elena Antonetti, Rome (IT)

(73) Assignee: STAMICARBON B.V., Sittard (NL), ACTING UNDER THE NAME OF MT INNOVATION CENTER (*) Notice: Subject to any disclaimer, the term of this patent is extended or adjusted under 35 U.S.C. 154(b) by 0 days.

(21) Appl. No.: 14/118,201

(22) PCT Filed: Jun. 15, 2012

(86) PCT No.: PCT/NL2012/050424
§ 371 (c)(1),
(2), (4) Date: Dec. 30, 2013

(87) PCT Pub. No.: WO2012/173483
PCT Pub. Date: Dec. 20, 2012

(65) Prior Publication Data
US 2014/0105814 A1    Apr. 17, 2014

(30) Foreign Application Priority Data
Jun. 16, 2011 (EP) .................................. 11170211

(51) Int. Cl.
*C01B 3/12* (2006.01)
*C01B 3/50* (2006.01)
(Continued)

(52) U.S. Cl.
CPC ............... *C01B 3/505* (2013.01); *B01J 7/00* (2013.01); *B01J 19/245* (2013.01); *C01B 3/12* (2013.01);
(Continued)

(58) Field of Classification Search
CPC ..................................... C01B 3/12; B01J 7/00
(Continued)

(56) References Cited

U.S. PATENT DOCUMENTS 3,251,652 A   5/1966   Pfefferle
3,490,872 A   1/1970   Fenton
(Continued)

FOREIGN PATENT DOCUMENTS

EP        1 666 410       6/2006
EP        2 141 119       1/2010
WO      WO-2004/024299    3/2004

OTHER PUBLICATIONS

Iaquaniello et al., "Hydrogen palladium selective membranes: an economic perspective," in Membrane reactors for hydrogen production processes, (2011), pp. 57-78, M. De Falco, L. Marrelli, G. Iaquaniello (eds.), Springer, London.
(Continued)

*Primary Examiner* — Paul Wartalowicz
(74) *Attorney, Agent, or Firm* — Morrison & Foerster LLP

(57) ABSTRACT

The present invention relates to a method for hydrogen production and to a method of hydrogen and/or carbon dioxide production from syngas. The method comprises the steps of: (i) providing a gas stream comprising hydrogen and carbon monoxide, (ii) separating at least part of hydrogen from the stream yielding a hydrogen-depleted stream, (iii) subjecting the hydrogen-depleted stream to a water-gas shift reaction, and (iv) separating hydrogen from the stream resulting from step (iii). The method according to the invention improves the conversion of carbon monoxide in the water gas shift reaction and allows to increase the hydrogen production by 10-15% and to increase the overall energy efficiency of the system by 5-7%. The invention further relates to a plant for hydrogen and/or carbon dioxide production suitable for the method of the invention.

5 Claims, 3 Drawing Sheets

(51) Int. Cl.

| | | |
|---|---|---|
| *C01B 3/38* | (2006.01) | |
| *C01B 3/48* | (2006.01) | |
| *B01J 7/00* | (2006.01) | |
| *B01J 19/24* | (2006.01) | |
| *C01B 3/34* | (2006.01) | |
| *C01B 3/36* | (2006.01) | |

(52) U.S. Cl.
CPC .................. *C01B 3/34* (2013.01); *C01B 3/36* (2013.01); *C01B 3/38* (2013.01); *C01B 3/48* (2013.01); *B01J 2219/24* (2013.01); *C01B 2203/0233* (2013.01); *C01B 2203/0244* (2013.01); *C01B 2203/0261* (2013.01); *C01B 2203/0283* (2013.01); *C01B 2203/0288* (2013.01); *C01B 2203/0294* (2013.01); *C01B 2203/043* (2013.01); *C01B 2203/0405* (2013.01); *C01B 2203/047* (2013.01); *C01B 2203/0415* (2013.01); *C01B 2203/0475* (2013.01); *C01B 2203/0894* (2013.01); *C01B 2203/1047* (2013.01)

(58) Field of Classification Search
USPC ........................................................ 423/655
See application file for complete search history.

(56) References Cited

U.S. PATENT DOCUMENTS

| | | | | |
|---|---|---|---|---|
| 5,217,506 | A | * | 6/1993 | Edlund et al. ..................... 95/56 |
| 5,645,626 | A | * | 7/1997 | Edlund et al. ..................... 95/56 |
| 6,348,278 | B1 | * | 2/2002 | LaPierre et al. ............. 429/411 |
| 8,128,883 | B1 | * | 3/2012 | Wang ............................. 422/186 |
| 2003/0192693 | A1 | * | 10/2003 | Wellington ......... E21B 41/0064 166/267 |
| 2004/0131901 | A1 | * | 7/2004 | Yamashita et al. ............. 429/17 |
| 2004/0142220 | A1 | * | 7/2004 | Brenner et al. ................. 429/19 |
| 2006/0068246 | A1 | * | 3/2006 | Matsuo ............. H01M 8/04089 429/410 |
| 2008/0000350 | A1 | | 1/2008 | Mundschau et al. |
| 2010/0288123 | A1 | * | 11/2010 | Chen et al. ........................ 95/93 |
| 2011/0185898 | A1 | * | 8/2011 | Sundaram et al. ............... 95/55 |

OTHER PUBLICATIONS

Carrara et al., "Pd-Ag dense membrane application to improve the energetic efficiency of a hydrogen production industrial plant", International Journal of Hydrogen Energy (2011) 36:5311-5320.
International Search Report for PCT/NL2012/050424, mailed Oct. 1, 2012, 3 pages.

* cited by examiner

METHOD FOR HYDROGEN PRODUCTION

CROSS-REFERENCE TO RELATED APPLICATIONS

This application is the national phase of PCT application PCT/NL2012/050424 having an international filing date of 15 Jun. 2012, which claims benefit of European application No. 11170211.4, filed 16 Jun. 2011. The contents of the above patent applications are incorporated by reference herein in their entirety.

FIELD OF THE INVENTION

The invention relates to the field of hydrogen production from hydrocarbons and, preferably, by steam reforming, autothermal reforming or catalytic partial oxidation of hydrocarbons.

BACKGROUND OF THE INVENTION

Hydrogen production from fossil fuels and especially by steam reforming of methane or other hydrocarbons is currently the most common process for the production of hydrogen on an industrial scale. In this process, fossil fuel, for example natural gas or methane, is reacted with steam at high temperatures (700-1100° C., typically 700-900° C.) to produce synthesis gas (syngas), a gas mixture primarily made up of hydrogen ($H_2$) and carbon monoxide (CO). Syngas can also be obtained by autothermal reforming or by catalytic partial oxidation of hydrocarbons. Further, the syngas can be reacted with steam at a lower temperature in a water gas shift (WGS) reaction, to form carbon dioxide ($CO_2$) and hydrogen. In this way the hydrogen recovery from the hydrocarbon feed is further increased.

Since in the above reactions CO and $CO_2$ are formed, production of hydrogen is associated with the emission of significant amounts of carbon oxides, which are considered greenhouse gases. In fact, during hydrogen production by natural gas reforming, more $CO_2$ is emitted than $H_2$ produced. In addition, since the reforming reaction employs high temperatures, a considerable amount of fuel is needed to be burnt to maintain the required temperatures, which further contributes to the high $CO_2$ emission.

The carbon dioxide emission and the fuel needed for the combustion can be decreased if the efficiency of the steam reforming process is improved. Currently, the thermal efficiency achieved at existing hydrogen plants is only 65-75% and, therefore, efficiency improvement is desired.

Methods are known in the prior art to improve the efficiency of the steam reforming processes. For example, US2008/0000350 A1 describes a method for hydrogen production wherein the water gas shift reaction is performed in an integrated water gas shift/hydrogen separation membrane system. In this system, hydrogen is separated in the same reactor where the water gas shift reaction occurs, which improves the process efficiency.

G. Barigozzi et al., Int Journal of Hydrogen energy, 36 (2011), 5311-5320 discloses several configurations wherein a membrane separation unit is placed before and after the water gas shift reactor or before the PSA unit. Barigozzi concludes that a configuration with the membrane unit placed after water gas shift reactor leads to the most efficient overall process.

Although attempts have been made to increase hydrogen production and efficiency in steam reforming, it is still desirable to further improve the overall efficiency of the process and the hydrogen recovery from a hydrocarbons-containing feed. In addition, it is desired to produce hydrogen having a lower caloric value of the feed and fuel needed to produce a volume of hydrogen (kcal/$Nm^3$). Hydrogen produced with a low caloric value of the feed is associated with lower production costs and a lower emission of carbon oxides caused by the production.

SUMMARY OF THE INVENTION

In order to better address one or more of the foregoing desires, the invention, in one aspect, provides a method for the production of hydrogen comprising the steps of:
 (i) providing a gas stream comprising hydrogen and carbon monoxide;
 (ii) separating at least 70 vol. %, preferably at least 80 vol. % of hydrogen from the stream by membrane separation using a thin palladium-based membrane having a thickness of 1-3 μm, yielding a hydrogen-depleted stream;
 (iii) subjecting the hydrogen-depleted stream to a water-gas shift reaction; and optionally
 (iv) separating hydrogen from the stream resulting from step (iii).

In another aspect, the invention relates to a method of hydrogen and carbon dioxide production, wherein additionally to the foregoing steps carbon dioxide is separated from the stream resulting from step (iii).

In yet a further aspect, the invention relates to a plant for hydrogen production, suitable for the method according to the invention, comprising a reactor 110 for the production of syngas from hydrocarbons, wherein an outlet of the reactor 110 is connected to an inlet of a first separation module 101, 101A for hydrogen separation having an outlet for hydrogen and an outlet for a hydrogen-depleted stream, wherein the outlet for the hydrogen-depleted stream is connected to an inlet of a shift reactor 103 for water gas shift reaction.

DETAILED DESCRIPTION OF THE INVENTION

Figure 1:
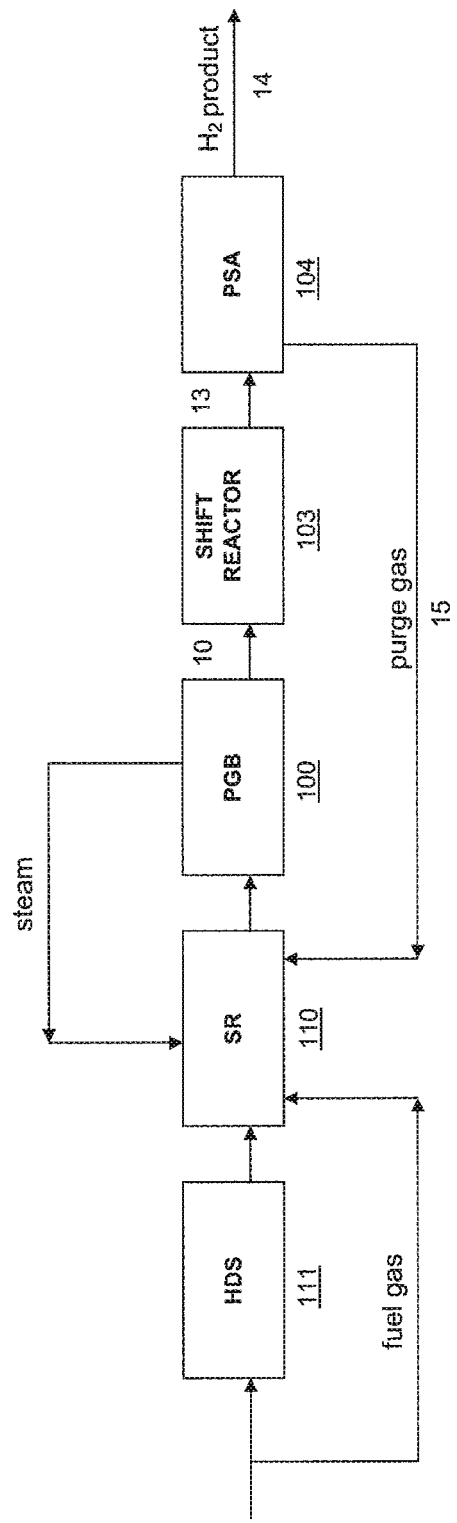
FIG. 1 shows a typical process scheme for hydrogen production known in the prior art.

The invention, in a broad sense, is based on the judicious insight to perform an additional hydrogen separation step in a typical hydrogen production system, before the water gas shift reaction, and to perform this using a thin membrane having a thickness of 1 μm to 3 μm. This additional separation step allows to increase hydrogen production and to decrease the caloric value of the produced hydrogen. Also, the overall efficiency of the production process is increased. In the invention, thus a judicious combination is provided of thin membranes, and positioning of these membranes upstream of a water gas shift reactor. As compared to positioning of membranes for hydrogen separation after the water gas shift reaction, the invention provides for a process enjoying significant advantages. Particularly, a high flux is obtained, and allowing a hydrogen depleted stream to enter the water gas shift reactor, provides for a more economical and efficient process.

The use of the aforementioned thin membranes provides an advantage in that it opens up a possibility to further enhance the trans-membrane flux of hydrogen. This can be executed by applying a sweep gas downstream of the membrane. The sweep gas should be substantially inert to hydrogen. Without detracting from other inert gases or gas mixtures that can be used, such as noble gases, or steam, the preferred gas is nitrogen. The sweep gas, which serves to remove hydrogen, in effect leads to a decrease of the hydrogen partial pressure at the downstream side of the membrane. By virtue of the relatively low membrane thickness of 1 μm to 3 μm, the upstream gas flow of hydrogen will be directly affected by the resulting steeper trans-membrane gradient of hydrogen pressure. This, in effect, causes an increased trans-membrane flux of hydrogen to occur.

The process of the invention starts with making or obtaining a hydrogen rich gas, or preferably, synthesis gas (syngas). Syngas is a gas mixture containing hydrogen and carbon monoxide and is usually obtained from hydrocarbons. Any suitable source of syngas can be used in the present invention. It is however preferred that the syngas is obtained by steam reforming (SR), by autothermal reforming (ATR) or by catalytic partial oxidation (CPO) processes. More preferably, the source of the syngas is a steam reforming reaction, such as obtained downstream to a steam reformer.

The important step of the present invention is the separation of at least 70%, preferably at least 80% of hydrogen from the syngas before the water gas shift reaction. In case the syngas is obtained from a steam reformer, the method according to the invention is in fact a modification of an existing steam reforming process employing the steps of steam reforming and a WGS reaction, wherein hydrogen is additionally separated from the syngas stream before the WGS reactor. The hydrogen separation is preferably done in a separate device and more preferably, in a membrane separator. Hydrogen selective membranes are known to a skilled person and are commercially available. Preferably, hydrogen permeable membranes characterised by high hydrogen selectivity and high $H_2$ flow are used, such as palladium-based membranes. In the invention thin palladium membranes are used, generally having a thickness of from 1 to 3 μm. These membranes can be manufactured according to the method described in "Membrane Reactors for hydrogen production processes", M. De Falco, L. Marrelli, G. Iaquaniello (Eds.), Springer, 2011.

If needed, the syngas as obtained from a SR, ATR or CPO reactor is cooled down to a working temperature of the separation membrane used, before entering the separation module, in order to avoid damaging the membrane. The cooling can, for example, be done in a process gas boiler, or by direct quenching. It is thus preferred to cool the gas stream to a temperature lower than the maximum working temperature of the hydrogen separator and even more preferred to at least 5° C. lower. In case of the above mentioned palladium-based membranes, the working temperature is typically in the range of 350-500° C., or preferably in the range 400-450° C. Therefore, the syngas is preferably cooled to a temperature of at most 450° C. before entering the membrane separation reactor, and preferably to at most 445° C.

As mentioned above, at least 70 vol. % of the hydrogen contained in the syngas stream is separated. The hydrogen separation at this stage improves the subsequent conversion of carbon monoxide in the WGS reaction and therefore the general process efficiency. Preferably, at least 75 vol. % and more preferably at least 80 vol. % of the hydrogen is separated. Although all hydrogen can be separated, the best improvement of the overall efficiency and hydrogen production is achieved when between 70 and 90 vol. % of total hydrogen present in the stream, more preferably between 80 and 90 vol. %, is separated.

Pure hydrogen that is separated from the syngas stream is at low pressure and can further be compressed and delivered at battery limit. It can also be combined with other hydrogen-rich streams, and/or it can be additionally purified by pressure swing absorption (PSA) to obtain ultra pure hydrogen.

The hydrogen-depleted stream after the hydrogen separation step is further routed to a water gas shift reactor (WGSR), wherein the carbon monoxide and steam are converted to hydrogen and carbon dioxide. In a preferred embodiment, the temperature of the hydrogen-depleted stream is adapted to the temperature of the WGSR, before entering the reactor, which can be done in a heat exchanger. Preferably, the stream is cooled to the inlet temperature of the WGS reactor.

The WGS reaction is typically carried out using either a single stage or multi stage process to attain the desired degree and rate of conversion. In a multi stage process, the high temperature stage (HTS) operates at 300-450° C. and typically in the presence of an iron-based catalyst such as Fe/Cr. In the HTS the largest amount of CO is converted. In the following stage, medium or low temperature stage (MTS or LTS), the operating temperature is about 180-280° C. and typically a copper/zinc catalyst supported on alumina (Cu/Zn/Al) catalyst is used. In these latter stages the residual CO concentration in the outlet stream is typically as low as 0.1-0.3%. In case of a CPO process as the source of the syngas, also steam may be added in the WGS reactor. If needed, the hydrogen-depleted gas stream is transferred through a heat exchanger before entering the WGS reactor, to better control the inlet temperature of the gas stream before the water gas shift reaction.

The gas stream resulting from the WGSR contains mainly hydrogen and carbon dioxide. Optionally, hydrogen is separated from this stream by pressure swing absorption (PSA) to yield a pure hydrogen stream. Preferably, the PSA unit in the present invention is suitable for handling gas streams having a low hydrogen content.

In a further interesting embodiment, an inert sweep gas, e.g. steam or, preferably, nitrogen, is applied downstream of the membrane. As mentioned above, this has a beneficial effect in enhancing the trans-membrane flux of hydrogen. A further advantage of this embodiment, is that the sweep gas can be applied to cool the membrane. By virtue of the relatively low thickness of the membranes used in the invention, viz. of from 1 μm to 3 μm, the sweep gas can be applied as the sole coolant for the membrane reactor. Thus, the use of sweep gas has a synergistic effect of enhancing hydrogen flux (leading to a more efficient process), as well as the possibility to use it as a means to control the temperature of the membrane. E.g., it can be used as a coolant, and then it is possible to dispense with additional cooling means (which has clear advantages in terms of energy consumption and process economics).

In another aspect, the present invention relates to a method of hydrogen and carbon dioxide production. In addition to the steps described above, the method has a further step of carbon dioxide separation after the WGS reaction. The $CO_2$ separation is performed using conventional means, e.g., chemical absorption techniques. In this way at least 90% and preferably 99% of $CO_2$ is removed from the stream, which then can be delivered as a product at battery limit. The remaining gas can advantageously be used together with fuel gases for combustion. The separation of $CO_2$ from the stream improves further the thermal efficiency of the hydrogen production process.

In a preferred embodiment, before the $CO_2$ is removed from the gas stream originating from the shift reactor, an additional separation step of hydrogen from the stream originating from the shift reactor is performed. In this way the hydrogen production is further increased. This stream of hydrogen can be combined with the hydrogen stream originating from the first separation step, performed before the WGS reaction. Since in this case both hydrogen and carbon dioxide are removed from the gas stream, no PSA is needed at the end of the process. A small PSA unit, however, may be used to further purify separated hydrogen to obtain ultrapure hydrogen. Smaller PSA unit needed to purify hydrogen produced is another advantage of the present invention.

As already mentioned, the process according to the present invention achieves an improved conversion of CO into $CO_2$ and $H_2$ in the water gas shift reaction and, as a result, a higher overall hydrogen production. The process of the invention allows to achieve a better CO conversion at the same reactor outlet temperature. In this way, the hydrogen production can be increased by 10-15% and the overall energy efficiency of the system by 5-7%.

Additionally, a benefit of the present invention is that the CO conversion and $H_2$ separation reactions can be decoupled and, therefore, the reaction conditions can independently be optimized. This has as an advantage that a simpler membrane separator may be used for hydrogen separation, which does not require catalyst to be embedded. In this way the interference of the metals in the separation membrane and in the catalyst of CO conversion is avoided. Further, the present invention makes it possible to easily achieve a higher hydrogen production and a higher conversion by simply adding a hydrogen separation unit to an already existing plant. Therefore, minimal alterations to the existing equipment are required. The existing unit can also serve as a bypass around the separation unit to allow for example maintenance in case of upsets.

In another aspect, the invention relates to a method for increasing the capacity of a hydrogen production plant, the method comprising adding a membrane separation unit for hydrogen separation between a syngas production reactor and a water gas shift reactor. For hydrogen plants wherein syngas is produced by steam reforming, a membrane separation unit is added between the steam reformer and the water gas shift reactor. In a preferred embodiment, at least 70-90 vol. % of hydrogen is separated in the additional step. In a further preferred embodiment, a thin palladium-based membrane having a thickness of 1-3 μm is used for the hydrogen separation in this additional step. The increase in capacity means increased production of hydrogen. This has as an advantage that existing plants can be modified according to the method of the invention to produce more hydrogen without considerable changes to the equipment. As illustrated in the examples, the capacity of an existing hydrogen plant can be increased by 10%, while the energy requirement per unit (caloric value kcal/Nm$^3$) of the hydrogen produced is decreased by about 7%.

In yet a further aspect, the invention relates to a plant for hydrogen production suitable for the method according to the invention, comprising a reactor for the production of syngas from hydrocarbons, wherein an outlet of the reactor is connected to an inlet of a first separation module for hydrogen separation having an outlet for hydrogen and an outlet for a hydrogen-depleted stream, wherein the outlet for the hydrogen-depleted stream is connected to an inlet of a shift reactor for water gas shift reaction. An outlet of the shift reactor is preferably connected to a PSA unit for hydrogen separation.

In a preferred embodiment, the plant is suitable for hydrogen and carbon dioxide production and comprises a shift reactor provided with an outlet connected to a $CO_2$ removal unit, provided with an outlet for carbon dioxide and an outlet for off-gases. Since in this case both hydrogen and carbon dioxide are removed from the gas stream, no PSA is needed at the end of the process. A small PSA unit, however, may be used to further purify separated hydrogen to obtain ultrapure hydrogen. The PSA unit in this embodiment may be significantly smaller than in the embodiments in the prior art because the stream entering the PSA is smaller because part of the hydrogen has already been removed by the separation step. However, when the $H_2$ separated before the WGSR is also fed to the PSA, a conventional sized PSA unit may be used.

In a preferred embodiment, the plant is provided with a second separation module for hydrogen separation placed between the shift reactor and the $CO_2$ removal unit, said separation module provided with an outlet for hydrogen and an outlet routed to the $CO_2$ removal unit. In a further preferred embodiment, the reactor suitable for the production of syngas is a steam reforming reactor, an autothermal reactor or a catalytic partial oxidation reactor. In another preferred embodiment, the plant is further provided with a heat exchanger placed between the first separation module and the shift reactor, to adjust the temperature of the incoming gas stream.

The present invention will further be described with respect to particular embodiments and with reference to certain drawings but the invention is not limited thereto but only by the claims. Any reference signs in the claims shall not be construed as limiting the scope. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun, e.g., "a" or "an", "the", this includes a plural of that noun unless something else is specifically stated. The percentages are by volume unless indicated otherwise.

A typical known process for hydrogen production by steam reforming is shown in FIG. 1. A feed comprising hydrocarbons, e.g., natural gas or methane, is first desulfurised in a hydrodesulfurisation (HDS) reactor 111. A part of the feed can also be used as fuel to heat the steam reformer. The desulfurised feed is further supplied to the steam reformer (SR) 110, wherein the hydrocarbons are reacted with steam at a high temperature (such as 700-900° C.). Syngas obtained in the result of the steam reforming reaction is then passed to a process gas boiler (PGB) 100, wherein the syngas is cooled to the temperature of the succeeding water gas shift (WGS) reaction. The cooling is usually done with water so that the thereby formed steam can be used in the steam reforming reaction. The cooled syngas 10 is then transferred to a shift reactor 103 wherein the WGS reaction takes place. The resulting stream 13 comprising hydrogen and carbon dioxide is routed to a pressure swing absorption (PSA) unit 104, wherein separation of hydrogen takes place. In an alternative embodiment a membrane separation unit can be used instead of a PSA. The hydrogen 14 can then be delivered at battery limit, while remaining purge gas 15 can be used for combustion to heat up the reformer.

Figure 2:
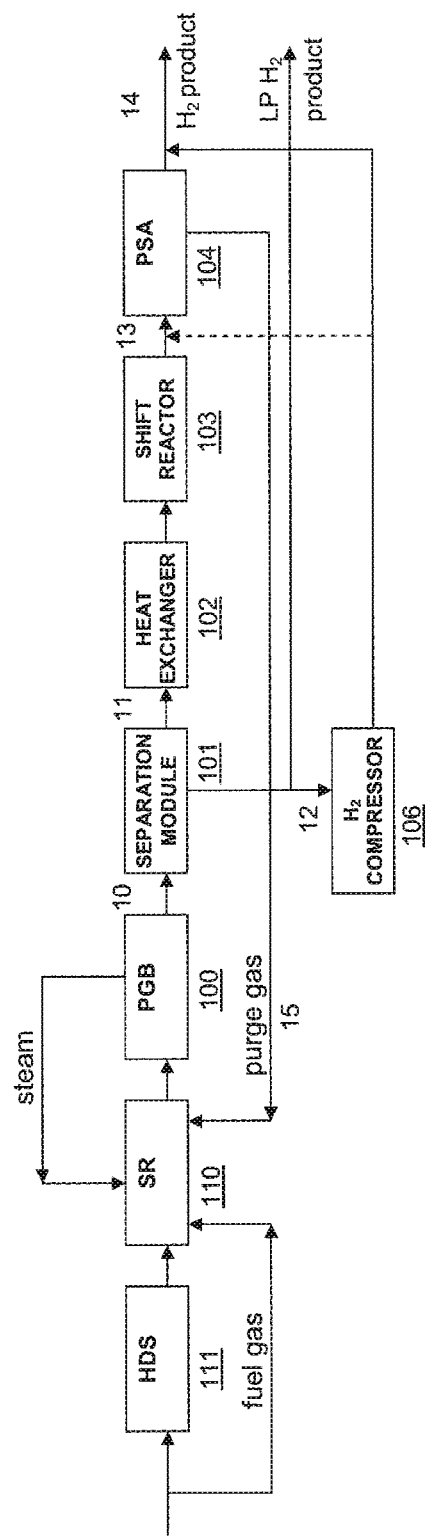
FIG. 2 shows a process scheme for hydrogen production according to a preferred embodiment of the invention.

A preferred embodiment for the hydrogen production according to the present invention is shown in FIG. 2. Similarly to a conventional method described in FIG. 1, syngas is obtained first in a SR 110 from a feed desulfurised in a HDS 111, and then cooled in a PGB 100. Subsequently, according to the invention, the cooled gas 10 is transferred to a separation module 101 for hydrogen separation. In this separation module from 70 to 90 vol. % of hydrogen is removed from the gas stream. Resulting stream 12 is a pure hydrogen stream (permeate) at lower pressure (LP), in the range of 2-10 barg, which can be delivered at battery limit. The hydrogen can also be compressed in a compressor 106 and delivered at battery limit at a desired pressure, or delivered to PSA unit 104, for further purification in order to obtain ultrapure hydrogen. The process gas 11, which is depleted in hydrogen, passes a heat exchanger 102 wherein it is cooled down (if desired) to the working temperature of the shift reactor 103. Stream 13 resulting from the WGSR 103 is cooled down to separate the condensate and is further transferred to a PSA unit 104 for the final purification of the hydrogen. The hydrogen separated in the PSA 104 can be mixed with hydrogen stream 101, while remaining purge gas can be used to heat up the SR.

Figure 3:
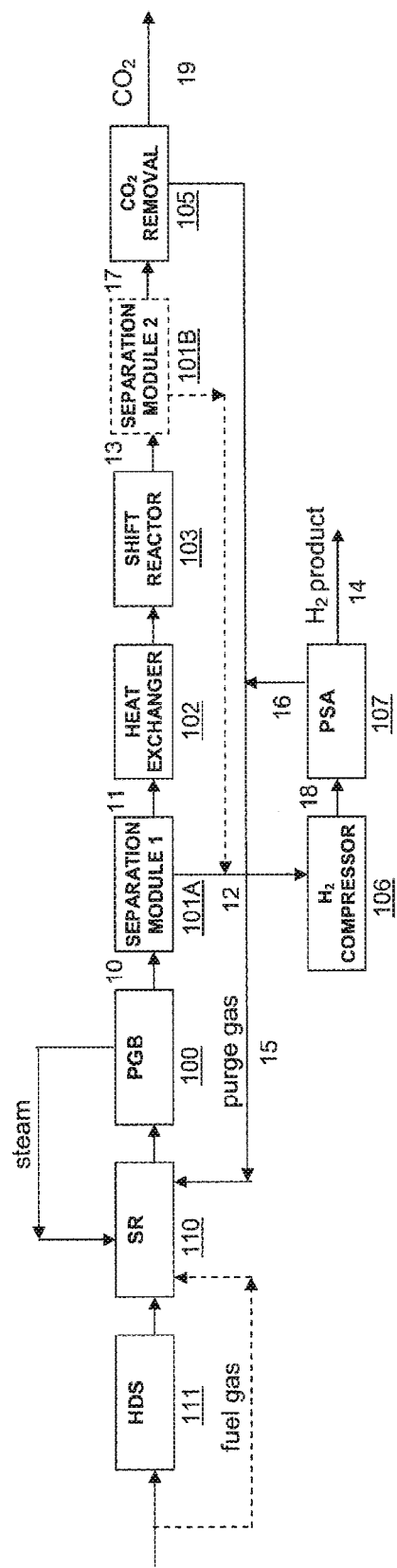
FIG. 3 shows a process scheme for hydrogen and carbon dioxide production, according to a preferred embodiment of the invention.

A preferred embodiment for both hydrogen and carbon dioxide production according to the present invention is shown in FIG. 3. This scheme is similar to that in FIG. 2, including a hydrogen separation module 101A downstream to a PGB 100, a heat exchanger 102 and a shift reactor 103. Further in this scheme, the stream 13 at the exit of the shift reactor 103 may be processed in an additional separation module 101B to separate hydrogen, or may be fed directly to a $CO_2$ removal unit 105. In the first case, the hydrogen-depleted stream 17 obtained from the separation module 101B is fed to a $CO_2$ removal unit 105, wherein the stream is separated into a pure $CO_2$ product stream 19 and an off-gas 15 containing $H_2$, CO and $CH_4$, the latter preferably being used together with fuel gas for combustion. In this case no PSA unit is required to produce the pure hydrogen product. However, a small PSA unit 107 can be used at the exit of the hydrogen compressor 106, if it is desired to convert hydrogen stream 18 into an ultrapure hydrogen product 14. The remaining purge gas 16 can be used together with fuel gases for combustion.

For the process schemes depicted in FIGS. 1 and 2, the composition of different gas streams is given in Tables 1 and 2, respectively. The streams are referenced by the same numbers as used in the process schemes. Stream 10 is a typical composition downstream to a SR.

TABLE 1

Material balance for the block diagram for producing $H_2$ via steam reforming (SR) in FIG. 1.

|  |  | 10 | 13 | 14 | 15 |
|---|---|---|---|---|---|
| Total Molar Comp. Percents |  |  |  |  |  |
| CH4 |  | 2.0 | 2.0 | 0.0 | 8.7 |
| CO2 |  | 6.2 | 12.5 | 0.0 | 53.5 |
| CO |  | 8.9 | 2.6 | 0.0 | 11.0 |
| H2 |  | 43.8 | 50.1 | 100.0 | 23.6 |
| H2O |  | 38.6 | 32.3 | 0.0 | 0.7 |
| N2 |  | 0.5 | 0.5 | 0.0 | 2.5 |
| Flowrate | KG-MOL/HR | 4386 | 4386 | 1954 | 1024 |
| Temperature | C. | 350 | 418 | 38 | 38 |
| Pressure | KG/CM2G | 27.3 | 26.9 | 25.25 | 0.3 |

TABLE 2

Material balance for the block diagram for producing $H_2$ via steam reforming (SR) in FIG. 2.

|  |  | 10 | 11 | 12 | 13 | 14 | 15 |
|---|---|---|---|---|---|---|---|
| Total Molar Comp. Percents |  |  |  |  |  |  |  |
| CH4 |  | 2.0 | 2.9 | 0.0 | 2.9 | 0.0 | 10.2 |
| CO2 |  | 6.2 | 8.9 | 0.0 | 19.4 | 0.0 | 68.0 |
| CO |  | 8.9 | 12.8 | 0.0 | 2.3 | 0.0 | 8.0 |
| H2 |  | 43.8 | 18.9 | 100.0 | 29.4 | 100.0 | 10.3 |
| H2O |  | 38.6 | 55.6 | 0.0 | 45.1 | 0.0 | 0.5 |
| N2 |  | 0.5 | 0.9 | 0.0 | 0.9 | 0.0 | 3.0 |
| Flowrate | KG-MOL/HR | 4386 | 3043 | 1343 | 3043 | 2149 | 869 |
| Temperature | C. | 350 | 350 | 350 | 456 | 111 | 38 |
| Pressure | KG/CM2G | 27.3 | 27.1 | 5.5 | 26.9 | 24.5 | 0.3 |

It is clear from Tables 1 and 2 that the flow of hydrogen in stream 14 is increased by approximately 10%. Due to the fact that the gas stream 13 fed to the PSA unit has a much lower CO content, the PSA efficiency is improved and, as a result, the overall $H_2$ recovery factor is improved by 0.5-1.5%. To compensate the reduced amount of purge gas 15 and its lower heating value, an additional small amount of natural gas is burnt into the SR to provide the required reforming duty. Although an additional small amount of natural gas needs to be burnt, the overall system efficiency is higher since less feed is needed to produce same amount of hydrogen.

In case of the process according to FIG. 2, the hydrogen production is increased by 10%, while the caloric value kcal/$Nm^3$ of produced hydrogen is decreased by about 7%. In the scheme of FIG. 2, hydrogen is produced at a relatively low pressure directly from the separation module and needs to be compressed. However, even considering the additional energy needed to compress hydrogen, the overall efficiency is still better than in the conventional process.

Table 3 describes the stream composition for the embodiment illustrated in FIG. 3. The streams are referenced by the same numbers as used in the process scheme. The same composition is used for the initial feed of syngas 10, being a typical composition downstream to a SR.

TABLE 3

Material balance for the block diagram for producing $H_2$ and $CO_2$ via steam reforming (SR) in FIG. 3.

| | | 10 | 11 | 12 | 13 | 14 | 15 | 16 | 17 | 18 | 19 |
|---|---|---|---|---|---|---|---|---|---|---|---|
| Total Molar Comp. Percents | | | | | | | | | | | |
| CH4 | | 2.0 | 3.1 | 0.0 | 3.1 | 0.0 | 10.3 | 0.0 | 6.1 | 0.0 | 0.0 |
| CO2 | | 6.2 | 9.7 | 0.0 | 21.4 | 0.0 | 0.7 | 0.0 | 41.4 | 0.0 | 100.0 |
| CO | | 8.9 | 13.8 | 0.0 | 2.1 | 0.0 | 6.8 | 0.0 | 4.0 | 0.0 | 0.0 |
| H2 | | 43.8 | 12.3 | 100.0 | 24.1 | 100.0 | 78.8 | 0.0 | 46.5 | 100.0 | 0.0 |
| H2O | | 38.6 | 60.2 | 0.0 | 48.4 | 0.0 | 0.4 | 0.0 | 0.2 | 0.0 | 0.0 |
| N2 | | 0.5 | 0.9 | 0.0 | 0.9 | 0.0 | 3.0 | 0.0 | 1.8 | 0.0 | 0.0 |
| Flowrate | KG-MOL/HR | 4386 | 2815 | 1571 | 2815 | 1571 | 860 | 0.0 | 1457 | 1571 | 597 |
| Temperature | C. | 350 | 350 | 350 | 466 | 38 | 38 | 38 | 38 | 155 | 38 |
| Pressure | KG/CM2G | 27.3 | 27.1 | 5.5 | 26.9 | 23.8 | 25.3 | 0.3 | 26.0 | 24.5 | 0.3 |

In the process scheme of FIG. 3 hydrogen is further purified in a smaller PSA unit, while the gas after the $CO_2$ removal unit is routed directly to the SR and used as supporting fuel if its caloric value is high enough. The removal of $CO_2$ from the process stream further improves the thermal efficiency of the SR reformer.

The invention claimed is:

1. A method for hydrogen production in an industrial plant, comprising the steps of:
   (i) providing from a steam reformer a gas stream comprising hydrogen and carbon monoxide;
   (ii) separating at least 70 vol. % of hydrogen from the stream by membrane separation wherein said separating comprises applying the said stream to a thin palladium-based membrane having a thickness of 1-3 μm yielding a hydrogen enriched stream and a first hydrogen-depleted stream;
   (iii) subjecting the hydrogen enriched stream to compression and delivering the compressed hydrogen enriched stream to battery limit;
   (iv) subjecting the hydrogen-depleted stream to a water-gas shift reaction;
   (v) directly separating hydrogen from the stream resulting from step (iv) yielding a hydrogen stream and a second hydrogen depleted stream; and
   (vi) delivering the hydrogen stream from step (v) to battery limit;
   wherein said separating in step (v) is performed with a pressure swing absorption unit, yielding said hydrogen stream and a purge gas, wherein the purge gas is used to heat said steam reformer, and
   wherein at least a part of said compressed hydrogen enriched stream from step (iii) is further purified in said pressure swing absorption unit, and the hydrogen from said pressure swing absorption unit is delivered to battery limit.

2. The method of claim 1, further comprising separating carbon dioxide from the second hydrogen depleted stream resulting from step (v).

3. The method according to claim 1, wherein in step (ii) 70-90 vol. % of hydrogen is separated.

4. The method according to claim 1, wherein in step (ii) an inert sweep gas is applied downstream of the membrane.

5. The method of claim 1, wherein step (i) comprises desulfurizing hydrocarbon gas in a hydrodesulfurization reactor and subjecting the desulfurized gas to steam reforming in said steam reformer.

* * * * *